United States Patent [19]

Ino

[11] Patent Number: 5,060,071

[45] Date of Patent: Oct. 22, 1991

[54] FULL-SIZE OPTICAL SENSOR DEVICE HAVING IMPROVED DRIVING MEANS

[75] Inventors: Masumitsu Ino; Hiroyuki Tanaka; Takehito Nagata, all of Yokohama, Japan

[73] Assignee: Ricoh Company, Ltd., Tokyo, Japan

[21] Appl. No.: 554,462

[22] Filed: Jul. 19, 1990

[30] Foreign Application Priority Data

Jul. 24, 1989 [JP] Japan .................................. 1-190851

[51] Int. Cl.$^5$ ......................... H04N 5/335; H04N 3/14
[52] U.S. Cl. ............................... 358/213.11; 358/482; 358/455; 250/208.1; 357/24 LR
[58] Field of Search ...................... 250/208.1; 358/482, 358/483, 455, 213.11; 357/24 LR

[56] References Cited

U.S. PATENT DOCUMENTS

| | | | |
|---|---|---|---|
| 4,644,411 | 2/1987 | Sato et al. | 250/208.1 |
| 4,673,821 | 6/1987 | Morita | 358/482 |
| 4,691,242 | 9/1987 | Kato | 250/208.1 |
| 4,827,146 | 5/1989 | Ogawa et al. | 250/208.1 |
| 4,876,585 | 10/1988 | Ozawa | 250/208.1 |

FOREIGN PATENT DOCUMENTS

60-218870 11/1985 Japan .
61-39570 2/1986 Japan .

*Primary Examiner*—James J. Groody
*Assistant Examiner*—Glenton B. Burgess
*Attorney, Agent, or Firm*—Oblon, Spivak, McClelland, Maier & Neustadt

[57] ABSTRACT

A full-size optical sensor device includes a sensor array having a plurality of photoelectric conversion elements. The sensor array is divided into a plurality of groups, each of them having a plurality of the photoelectric conversion elements. The full-size optical sensor also includes a driving circuit for selectively driving the photoelectric conversion elements of the sensor array. The driving circuit includes a shift register and a selector for selecting one of the driven photoelectric conversion elements in accordance with an external control signal and a shifting operation of the shift register. The selector includes a plurality of circuit sets, each of the circuit sets being connected between one of the bits of the shift register and one of the groups having photoelectric conversion elements. Each of the circuit sets selects one of the driven photoelectric conversion elements in accordance with the external control signal and a signal from one of the bits of the shift register.

17 Claims, 12 Drawing Sheets

FULL-SIZE OPTICAL SENSOR DEVICE HAVING IMPROVED DRIVING MEANS

BACKGROUND OF THE INVENTION

The present invention generally relates to a full-size optical sensor device, and more particularly to a full-size optical sensor which is applied to a contact type full-size image sensor used in a document scanner, a liquid crystal display, an EL display and so on.

Figure 1:
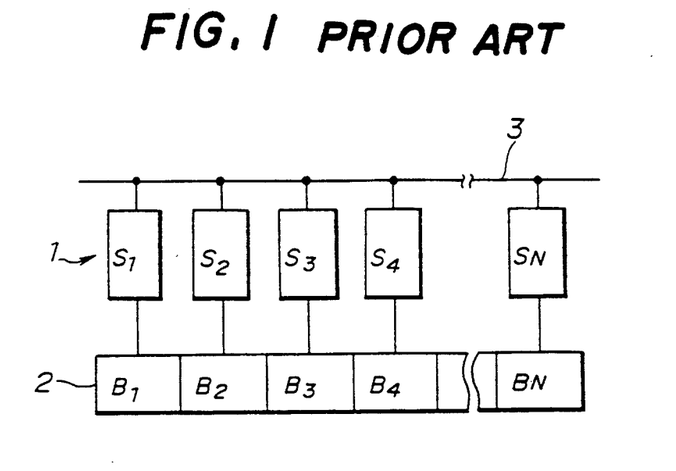
FIGS. 1 through 3 respectively illustrate structures of conventional full-size image sensor devices.

Conventionally, a contact type full-size optical image sensor is, for example, used as an image sensor for reading an image from a document. The contact type full-size image sensor has substantially the same width as the document and is used so as to be substantially in contact with the document. Thus, it is unnecessary to provide a reducing optical system for the contact type full-size image sensor so as to prevent the image sensor from becoming large. The contact type full-size image sensor described above is basically structured as in FIG. 1. Referring to FIG. 1, a plurality of photoelectric conversion elements Sl through Sn are arranged in a line. The plurality of photoelectric conversion elements Sl through Sn make up a sensor array 1. Each of the plurality of photoelectric conversion elements Sl through Sn is made up of a photo diode and a capacitance. An end of each of the plurality of photoelectric conversion elements Sl through Sn is connected to a corresponding one of bits Bl through Bn of a shift register 2. The other end of each of photoelectric conversion elements Sl through Sn is connected to a signal output line 3. Then, each of the photoelectric conversion elements Sl through Sn is driven by a corresponding one of the bits Bl through Bn of the shift register 2, and an electrical signal generated by each of the photoelectric conversion elements Sl through Sn is supplied through the signal output line 3 to a process system including a peak hold circuit and so on. In this contact type full-size image sensor, the photoelectric conversion elements Sl through Sn are formed on a substrate as the sensor array 1, and the shift register 2, which operates as a driver circuit made up of thin film transistors, is also formed on the substrate.

It has been proposed that, to increase the number of photoelectric conversion elements within a predetermined length, which is termed a density of elements, a density of the sensor array or the like, the thin film transistor (TFT) in the driver circuit be miniaturized. However, for example, in a case where the driver circuit is formed on a substrate having a large square measurement such as 30 cm × 30 cm, the elasticizing of the substrate during the production, namely the deformation of the substrate which is generated due to an increase and a decrease in the temperature which occurs during the production process of the image sensor, is relatively large. Thus, in this case, it is difficult to miniaturize the TFT. In the contact type full-size image sensor having the structure as shown in FIG. 1, when the density of the sensor array 1 is doubled, the number of TFTs making up the shift register, which is termed as the density of TFTs, the density of the shift register or the like, must also be doubled. However, it is difficult to increase the density of TFTs due to the above mentioned deformation of the substrate.

For example, in the conventional image sensor in which the density of the shift register is a value of 16 dot/mm, the length of each 1-bit of the shift register in the main scanning direction of the image sensor is 62.5 μm. In a case where the image sensor having the high density as has been described above is produced in accordance with the conventional production process, a mask alignment error, an alignment error at the time of the photolithography process and so on does occur. Thus, the output signal from the conventional high density image sensor is distorted in comparison with the sensor having a low density such as 8 dot/mm To eliminate the disadvantages described above and to increase the density of the sensor array, it is necessary to provide a circuit in which a 1-bit of the shift register can drive a plurality of photoelectric conversion elements. More particularly, it is necessary to provide signal synchronous circuits so as to respectively control the output from each corresponding 1-bit of the shift register and to select from each corresponding plurality of photoelectric conversion elements one of the photoelectric conversion elements.

Figure 2:
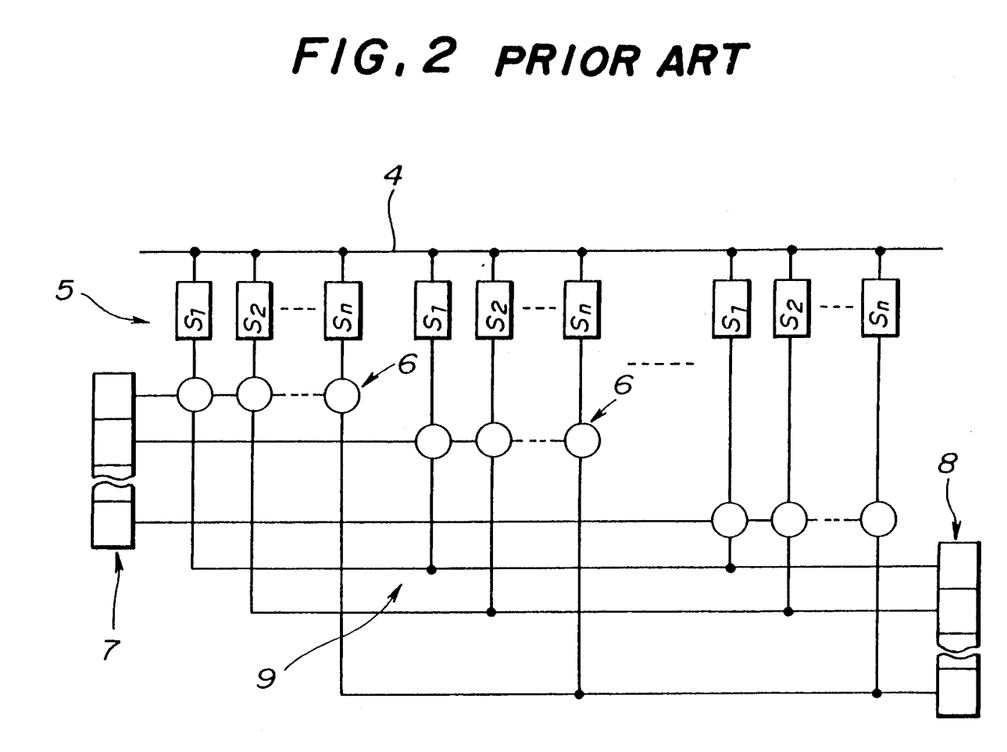

From this view point, a full-size image sensor having a plurality of the shift registers is disclosed in Japanese Laid-Open Patent Application No. 61-39570. FIG. 2 generally indicates this type of full-size image sensor. Referring to FIG. 2, an end of each photoelectric conversion element Sl through Sn in a sensor array 5 is connected to a signal output line 4. The other end of each of photoelectric conversion elements Sl through Sn is connected to a corresponding analogue switch 6. Each of analogue switches 6 is formed of the TFT. The analogue switches 6 are divided into a plurality of groups. Each of the groups includes n analogue switches 6. Due to two registers 7 and 8 and a matrix line circuit g, the groups are successively selected and the analogue switches 6 in each of the groups are successively driven.

Figure 3:
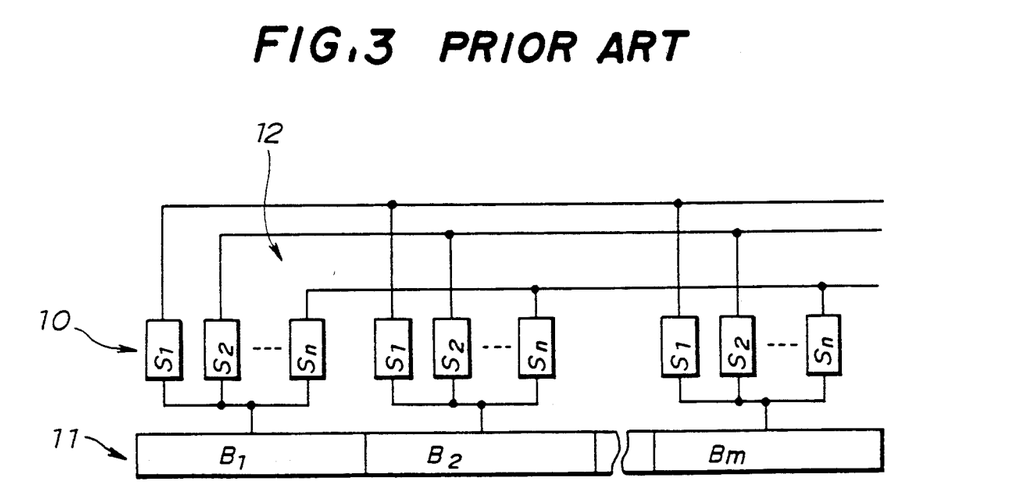

Another full-size image sensor is disclosed in Japanese Laid-Open Patent Application No.60-218870. For example, FIG. 3 indicates this type of full-size image sensor. Referring to FIG. 3, a plurality of photoelectric conversion elements of the sensor array 10 are divided into a plurality of groups. Each of the groups includes n photoelectric conversion elements. Common electrodes of all photoelectric conversion elements in each of the groups are commonly connected to one of the bits Bl through Bn of the shift register 11. Independent electrodes of the photoelectric conversion elements positioned at the same order i (i=1, 2, ... and n ) in every group are connected with each other by a matrix line circuit 12, and then output signals from each of the photoelectric conversion elements are supplied through the matrix line circuit 12 to the processing system.

In the full-size image sensor having the matrix circuitry line as has been described above, unwanted capacities are generated in parts of the matrix circuit line where lines in the matrix circuitry line are crossed with each other so that periodical noises occur.

In the former Japanese Laid-Open Patent Application which has the plurality of the shift registers, output lines of each of the shift registers are long so that the output from each of the shift register is attenuated, and thus a dispersion among the levels of output signals corresponding to the bits of the image sensor occurs.

In the later one, the plurality of output signal lines are provided so that it is necessary to provide a processing circuit coupled to each of the output signal lines, and thus the processing system is generally complicated.

SUMMARY OF THE INVENTION

Accordingly, a general object of the present invention is to provide a novel and useful full-size optical sensor device in which the disadvantages of the aforementioned prior art are eliminated.

A more specific object of the present invention to provide a full-size optical sensor device in which the structure is relatively simple and it is possible to increase the density of the sensor array without deteriorating the characteristics thereof.

The above objects of the present invention can be achieved by a full-size optical sensor device comprising a sensor array including a plurality of photoelectric conversion elements which are arranged in a line, each of the photoelectric conversion elements outputting image signals to one signal output line, wherein the sensor array is divided into a plurality of groups, each of them including a plurality of the photoelectric conversion elements, and driving means, coupled to the sensor array, for selectively driving the photoelectric conversion elements of said sensor array, the driving means comprising shift register means, including a plurality of bits which are arranged in a line, for shifting a predetermined binary data, and selecting means for selecting one of the driven photoelectric conversion elements in accordance with an external control signal and the predetermined binary data shifted by the shift register means, the selecting means including a plurality of circuit sets, each of the circuit sets being connected between one of the bits of the shift register means and one of the groups including photoelectric conversion elements, wherein each of the circuit sets selects one of the driven photoelectric conversion elements in a corresponding one of the groups in accordance with the external control signal when a corresponding one of the bits of the shift register means has the predetermined binary data.

Additional objects, features and advantages of the present invention will become apparent from the following detailed description when read in conjunction with the accompanying drawings.

DESCRIPTION OF THE PREFERRED EMBODIMENTS

A description will now be given of a first preferred embodiment of the present invention with reference to FIGS. 4 through 11. In this embodiment, the full-size optical sensor device according to the present invention is, for example, a contact type full-size image sensor used in a document reading apparatus.

Figure 4:
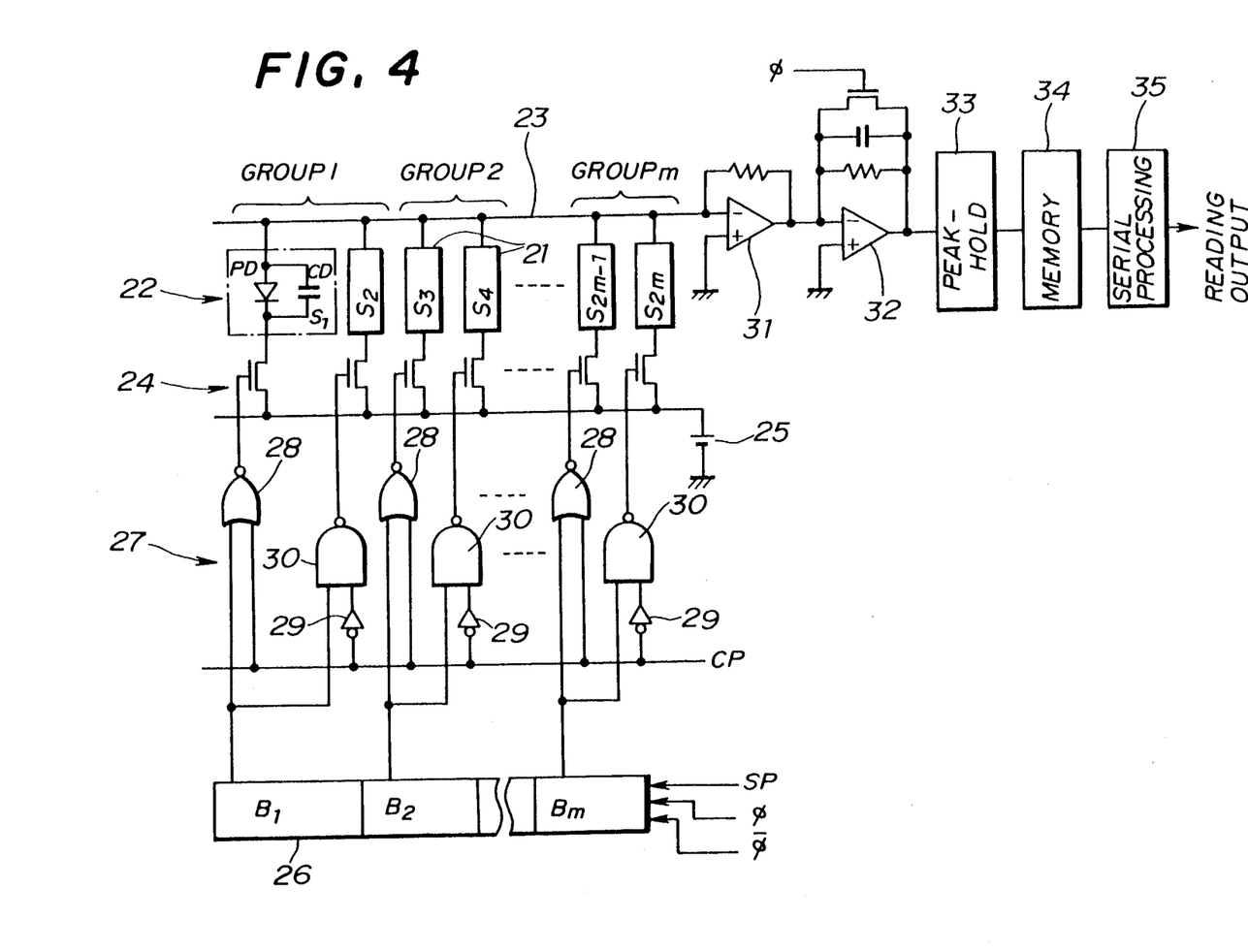
FIG. 4 is a circuit diagram showing a first embodiment of a full-size optical sensor device according to the present invention.

Referring to FIG. 4 which illustrates a circuit structure of the contact type full-size image sensor, a sensor array 22 has $2m$ photoelectric conversion elements 21 which are indicated by reference symbols S1 through S2m. The plurality of photoelectric conversion elements 21 are arranged in a line. Each of the photoelectric conversion elements 21 is made up of a photo diode PD and a capacitance CD, and then the photo diode PD and the capacitance CD are parallely connected with each other. An end of each of the photoelectric conversion elements 21 is connected to one signal output line 23. Another end thereof is connected to one of the switch elements formed of a p-channel transistor in an analogue switch 24. An end of each switch element in analogue switch 24 opposite to each end thereof connected to each respective one of the photoelectric conversion elements 21 is connected to a power source 25.

Figure 5:
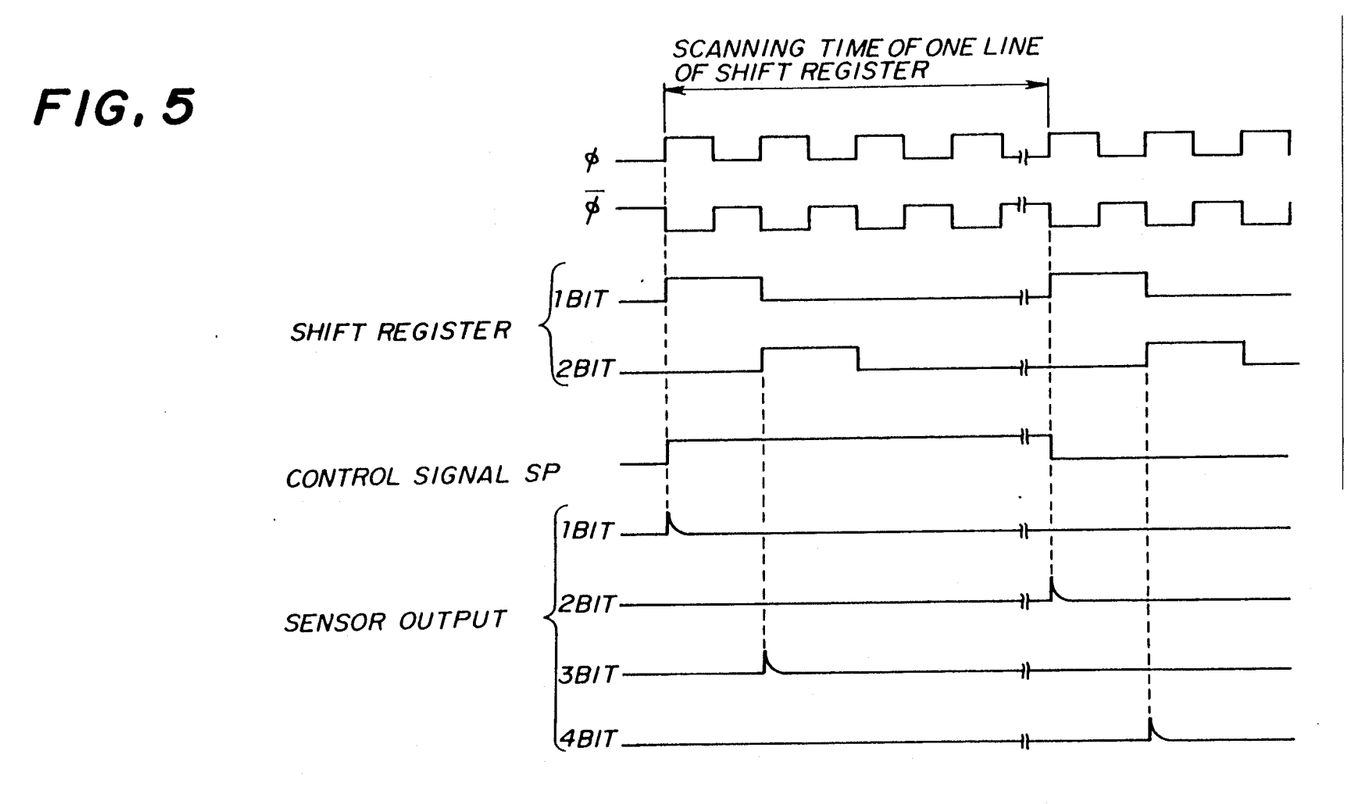
FIG. 5 is a wave form chart indicating an operation of a contact type full-size image sensor shown in FIG. 4.

The photoelectric conversion elements S1 through S2m are divided into m groups. Each of the groups includes two photoelectric conversion elements $S2i-1$ and $S2i$ ($i=2, 3, \ldots$ and m). A shift register 26 has m bits. That is, the number of bits of the shift register 26 is equal to the number of the groups of the photoelectric conversion elements 21. The shift register 26 operates in synchronism with two clock pulses $\phi$ and $\bar\phi$ and a start signal SP. Due to the operation of the shift register 26, the switch elements in the analogue switch 24 are successively operated so that the photoelectric conversion elements 21 are respectively driven. In this case, one bit of the shift register 26 drives the two photoelectric conversion elements in one of the groups. To prevent the two photoelectric conversion elements in each of the groups from being driven at the same time, a timing selecting circuit 27 is provided between the analogue switch 24 and the shift register 26. The timing selecting circuit 27 is controlled by a control signal CP supplied from an external controller ( not shown in FIG. 4). The timing selecting circuit 27 has a plurality of sets of a NOR gate 28, a NAND gate 30 and an inverter 29. Each of these sets corresponds to one of the groups of the photoelectric conversion elements. In each of the sets, the control signal CP is supplied to an input terminal of the NOR gate 28, and another input terminal of the NOR gate 28 is connected to one of the bits B1 through Bn of the shift register 26. An output terminal of the NOR gate 28 is connected to a control terminal of one of the switch elements, which element drives an odd numbered photoelectric conversion element $S2j+1$ ( $j=0, 1, \ldots$ and m ) in each group, in the analogue switch 24. The control signal CP is supplied through the inverter 29 to an input terminal of the NAND gate 30, and another input terminal of the NAND gate 30 is connected to the one bit of the shift register 26, to which the NOR gate 28 is connected. An output terminal of the NAND gate 30 is connected to a control terminal of one of the switch elements, which element drives an even numbered photoelectric conversion element S2j (j=1, 2, ... and m) in each group, in the analogue switch 24. The control signal CP undergoes a transition between high and low levels during the scanning time of one line of the shift register 26 as shown in FIG. 5. This scanning time of one line is the time in which all bits B1 through Bm of the shift register are scanned.

In the full-size image sensor having the structure described above, the shift register 26 operates in synchronism with two clock pulses $\phi$ and $\bar{\phi}$. That is, a high level pulse is successively shifted by one bit in synchronism with the clock pulses $\phi$ and $\bar{\phi}$ from bit B1 to bit Bn in the shift register 26, as shown in FIG. 5. When the level of the control signal CP is high, the output signal from each of the NAND gates 30 in the timing selection circuit 27 is maintained at a high level so that the switch element of the analogue switch 24 connected to the even photoelectric conversion element S2j in each of groups is in the OFF state. At this time, each of the NOR gates 28 in the timing selection circuit 27 is opened. Therefore, when the high level signal is stored in the bit Bi (i=1, 2, ... and m) of the shift register 26 during the shifting operation, the switch element coupled through each of the NOR gates 28 to the corresponding bit Bi of the shift register 26 turns ON so that the odd numbered photoelectric conversion element S2j+1 in each of the groups outputs an image signal to the signal output line 23. That is, the odd photoelectric conversion elements successively output the reading signals to the signal output line 23 in the order of S1, S3, ..., S2m+1 in accordance with the shifting operation of the shift register 26.

When the scanning of one line of the shift register 26 is ended, the control signal CP changes from a high level to a low level. Then, each of the NAND gates 30 is opened and the output of each of the NOR gates 28 is maintained at a high level. Therefore, when the high level signal is shifted in the shift register 26, in contrast with the case described above, the switch element of the analogue switch 24 connected to the odd numbered photoelectric conversion element S2j+1 in each of the groups is in the OFF state, and the even numbered photoelectric conversion element S2j in each of the groups outputs the image signal to the signal output line 23. That is, the even photoelectric conversion elements successively output the reading signals to the signal output line 23 in the order of S2, S4, ..., S2m in accordance with the shifting operation of the shift register 26.

In the contact type full-size image sensor described above, when the control signal CP supplied from the external controller is at a high level, image data in odd dots are read, on the other hand, when the control signal CP is at a low level, image data in even dots are read. That is, image data of one line read during the scanning of the image sensor is repeated twice.

According to the first embodiment described above, one bit of the shift register 26 drives a plurality of photoelectric conversion elements (for example, two photoelectric conversion elements) so that the number of bits of the shift register 26 is less than the number of photoelectric conversion elements 21. Thus, when the density of the sensor array 22 including photoelectric conversion elements S1 through Sn increases, it is unnecessary to increase the density of the shift register made up of TFTs in the same manner as the density of the sensor array 22 is increased. For example, it is possible to change the density of the sensor array from the conventional resolution of 8 dots/mm to the new resolution of 16 dots/mm or 32 dots/mm without changing the size of the TFT used in the conventional shift register. In addition, all of the photoelectric conversion elements 21 are connected to the same signal output line 23 so that it is unnecessary to provide a plurality of the processing circuits, and thus the structure of the processing system is simple, as will be described later. This contact type full-size image sensor has a circuit in which one of the photoelectric conversion elements, which outputs the image signal, is selected from one group by a control signal from the external controller so that the number of signal lines in the circuit is less than the number of signal lines in the conventional matrix line circuit. Only one signal line is connected to each bit of the shift register so that it is possible to prevent the signal output from the shift register from attenuating, and thus the dispersion of the level of the signal output from the image sensor also decreases.

In the contact type full-size image sensor described above, the even numbered photoelectric conversion elements S2j and the odd numbered photoelectric conversion elements S2j+1 alternately output image signals to the signal line 23. Therefore, it is necessary to change the order of the signals on the signal line 23 to a regular order in which signals output from the photoelectric conversion elements S1, S2, ... and S2m are successively arranged in a time series. Thus, the image signals output to the signal output line 23 are stored in a memory, and then, the reading signals are successively read out from the memory in the regular order.

Therefore, a signal processing circuit connected to the signal output line 23, for example, has an operational amplifier 31 which converts current to voltage, an integrator 32 operating in synchronism with the clock pulse $\phi$, a peak hold circuit 33, a memory buffer 34 and a serial processing circuit 35, as shown in FIG. 4. A current signal (image signal) on the signal output line 23 is converted to a voltage signal by the operational amplifier 31. The output signal from the operation amplifier 31 is integrated in a period of the clock pulse $\phi$ by the integrator 32. A peak level of the output signal from the integrator 32 in a period of the clock pulse $\phi$ is detected by the peak hold circuit 33. Then, the peak level detected by the peak hold circuit 32 for every period of the clock pulse $\phi$ is stored as image data in the memory buffer circuit 34. The image data is read out int he regular order from the memory buffer circuit 35 serially transmits the image data read out from the memory buffer 34 to an image processing system (not shown in FIG. 4).

Figure 6:
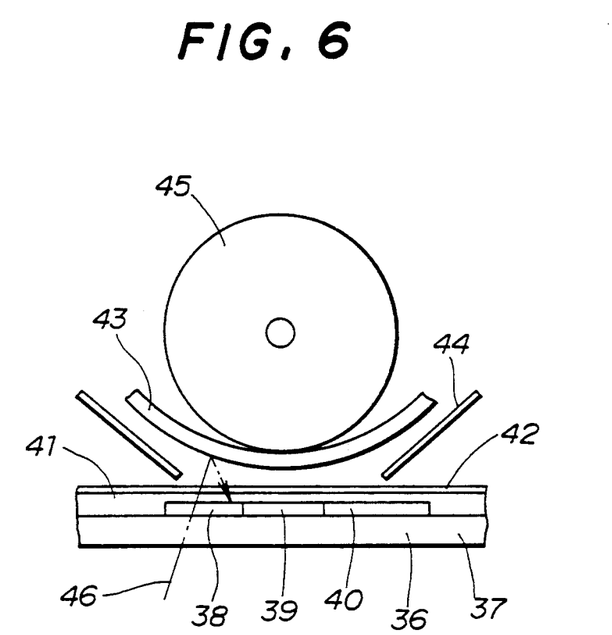
FIG. 6 is a side view illustrating a contact type full-size image sensor applied to a image reading device.

The contact type full-size image sensor as has been described above is, for example, formed as a unit, as shown in FIG. 6.

In FIG. 6, a sensor array 38 is formed on an insulating substrate 37 which is transparent, such as a quartz substrate. The sensor array 38 has a plurality of photoelectric conversion elements which are arranged in a line in a direction perpendicular to the sheet of FIG. 6. An analogue switch 39 and a driving circuit 40 having the timing selecting circuit 27 and the shift register 26 are also formed on the insulating substrate 37. The sensor array 38, the analogue switch 39 and the driving circuit 40 are covered by a protective layer 41, and a protective glass 42 is provided on the protective layer 41. A document sheet 43 is guided by a paper guide member 44 and is transported on the surface of the protective glass 42 by a pressing roller 45. When the document sheet 43 is transported on the surface of the contact type full-size image sensor 36, a light 46 is projected from a rear side of the substrate 37 on the document sheet 43. A reflected light from the document sheet 43 is projected on the sensor array 38. Then, the contact type full-size image sensor 36 outputs image signals as has been described above.

Figure 7:
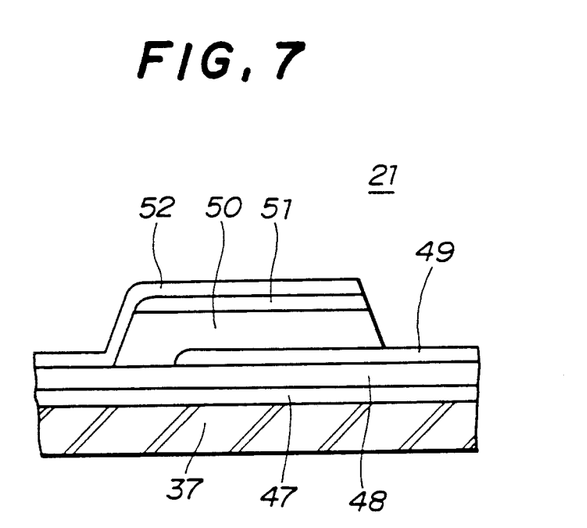
FIG. 7 is a sectional view illustrating a structure of a photoelectric conversion element.

The photoelectric conversion elements 21 are, for example, formed as shown in FIG. 7.

Figure 8:
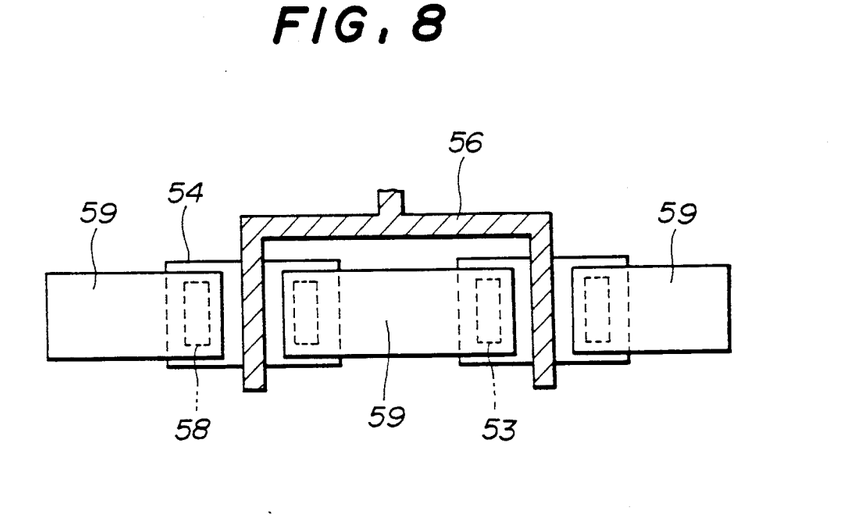
FIG. 8 and FIG. 9 illustrate a structure of a thin film transistor, FIG. 8 being a plan view and FIG. 9 being a sectional view, respectively.
Figure 9:
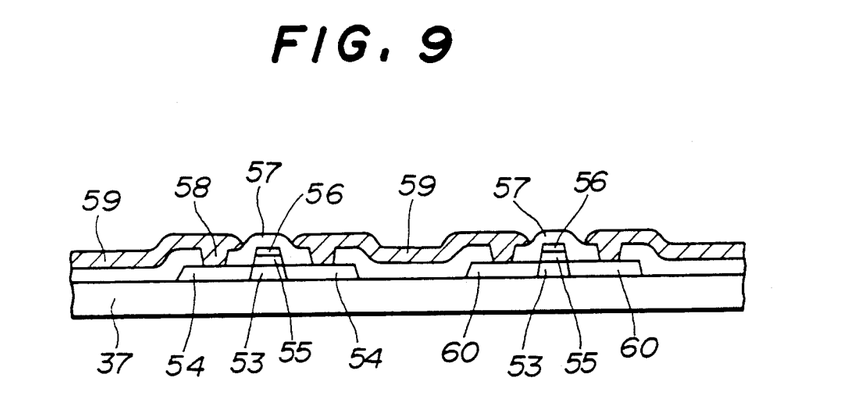

Referring to FIG. 7 which is a sectional view of the photoelectric conversion element 21, a protective layer 47 is formed on the substrate 37, a insulating layer 48 is formed on the protective layer 47 and a metal electrode 49 is provided on the insulation layer 48. Furthermore, adjacent to an edge of the metal electrode 49, a semiconductor layer 50 is formed on the metal electrode 49 and on the insulation layer 48. A protective layer 51 is provided on the semiconductor layer 50, and a transparent electrode 52 is formed so as to cover the surface of the protective layer 51, the side surface of the semiconductor layer 50 and the surface of the insulation layer 48. The semiconductor layer 50 is, for example, made up of a-Si:H and a-Si:OH. The driving circuit 40 is made up of the MOS type inverter (the planer type thin film transistor) having an active layer formed of polysilicon. The structure of the MOS type inverter is shown in FIGS. 8 and 9. Referring to FIGS. 8 and 9, a p channel type TFT and an n channel type TFT are formed on the substrate 37. In the P channel type TFT, two p+ type diffusion layers 54 are formed on the substrate 37 so as to be in contact with both sides of an active layer 53 formed on the substrate 37. In the n channel type TFT, two n+ type diffusion layers 60 are formed on the substrate 37 so as to be in contact with both sides of the active layer 54 formed on the substrate 37. In each of the TFTs, a gate oxide layer 55 and a gate electrode 56 are stacked on the active layer 53, and the gate oxide layer 55 and the gate electrode 56 are covered by an inter insulating layer 57. A contact hole 58 is formed on the inter insulating layer 57, and a metal electrode 59 is electrically connected to the P+ type or the n− type diffusion layer. Each of the switch elements of the analogue switch 24 is formed of the p channel type TFT (MOS). The analogue switch 24 is coupled through the timing selecting circuit 27 to the shift register 26. Each bit of the shift register 26 is formed in the same manner as the switch element of the analogue switch 24.

Figures 10A, 10B:
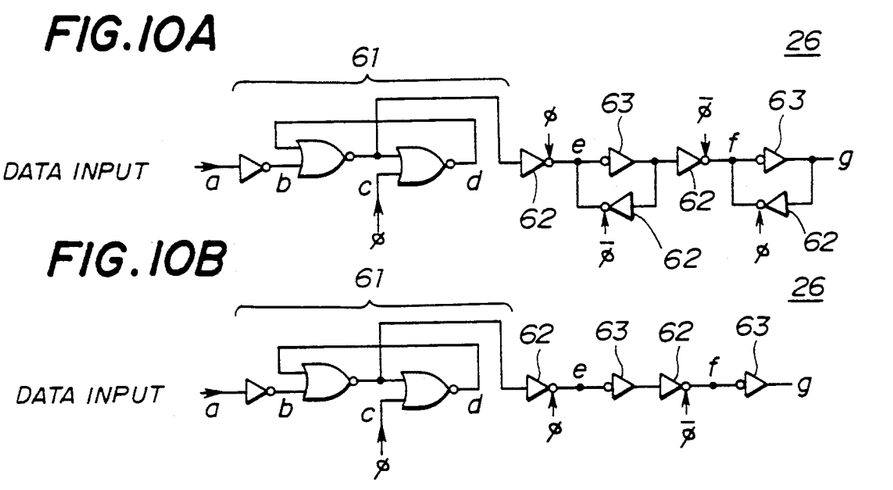
FIGS. 10A and 10B are logic circuit diagram indicating a shift register.
Figure 11:
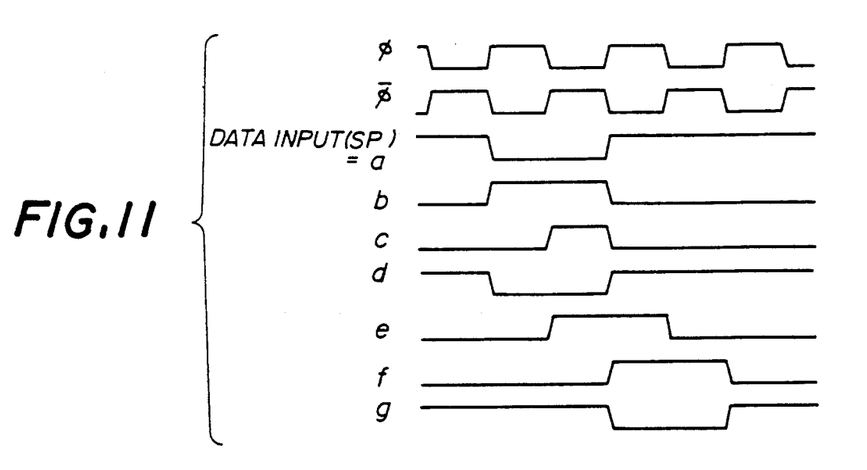
FIG. 11 is a wave form chart illustrating an operation of a shift register.

A logic circuit for each of the bits of the shift register 26 is, for example, shown in FIGS. 10A and 10B. FIG. 10A illustrates a logic circuit of a static type shift register, and FIG. 10B illustrates a logic circuit of a dynamic type shift register. Referring to FIGS. 10A and 10B, data is input to a data stabilizing circuit 61 having NOR gates and an inverter. The data stabilizing circuit 61 is connected to a circuit in which clocked gate inverters 62 and normal inverters 63 are alternately arranged. The clock pulse $\phi$ or $\bar{\phi}$ is input to each of the clocked gate inverters 62. The shift register operates in synchronism with the clock pulses $\phi$ and $\bar{\phi}$ so that in the case where the input signal has a wave form as shown in (a) of FIG. 11, signal wave forms at points (b) (c) (d) (e) (f) and (g) are generated as shown in FIG. 11. That is, the output signal (g) lags by one clock of the clock pulse $\phi$ behind the input signal (a).

The structure of each of the bits of the shift register is complicated as shown in FIGS. 10A and 10B, in contrast with the structure of each of the sets of the NAND gates 30, the NOR gates 28 and the inverters 29 in the timing selecting circuit 27.

Figure 12:
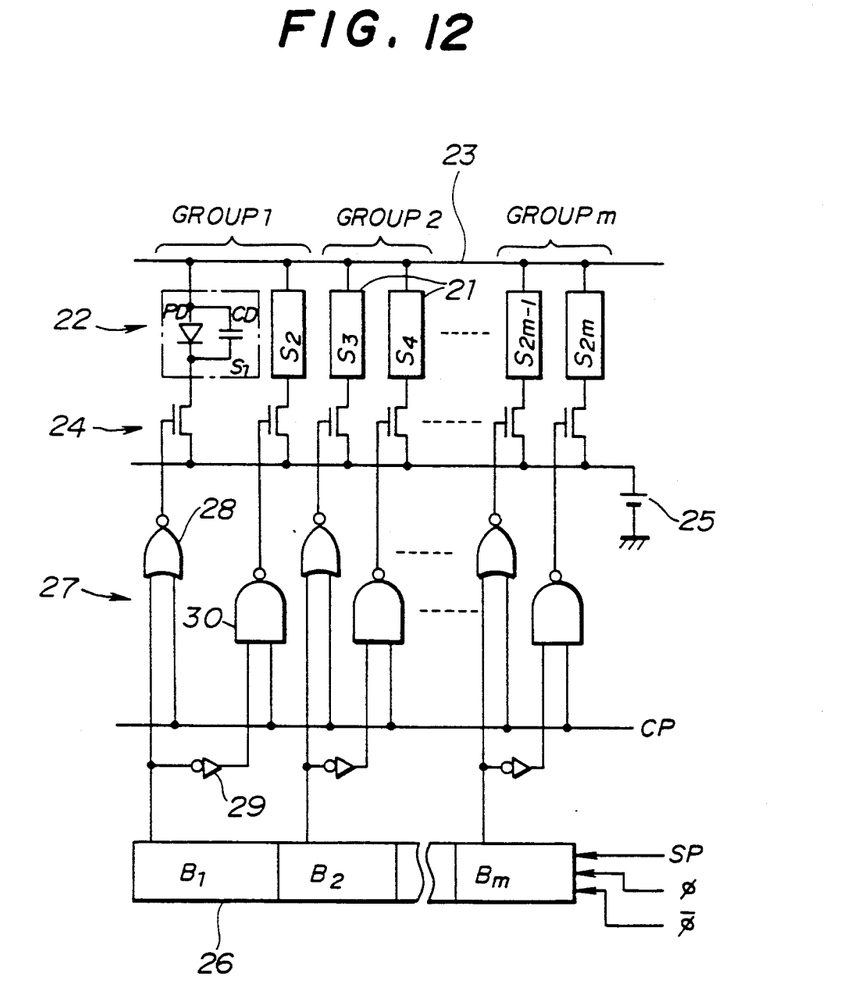
FIG. 12 is a circuit diagram illustrating the full-size optical sensor device according to a modification of the first embodiment.
Figure 13:
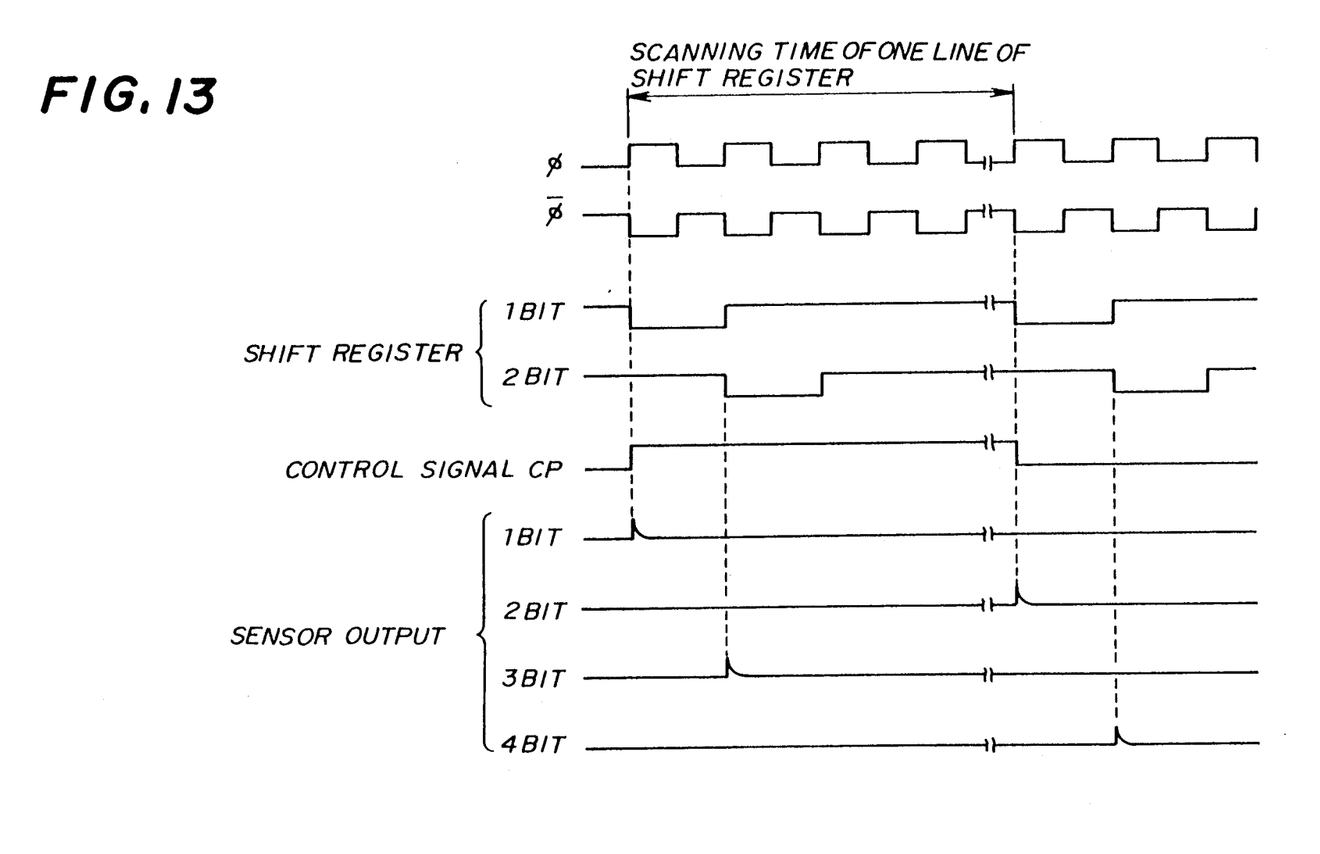
FIG. 13 is a wave form chart illustrating an operation of the full-size optical sensor device shown in FIG. 12.

FIG. 12 and FIG. 13 illustrates a modification of the first embodiment described above.

In this modification shown in FIGS. 12 and 13, a low level signal is shifted in the shift register 26. An output signal from a bit of the shift register 26 is inverted by the corresponding inverter 29, and then the inverted signal is input to the corresponding NAND gate 30. When the low level signal is stored in a bit of the shift register 26, the photoelectric conversion element corresponding to this bit of the shift register 26 outputs an image signal to the signal output line 23 in accordance with the control signal CP. In FIG. 12, those parts which are the same as those shown in FIG. 4 are given the same reference numbers and a description thereof is omitted.

In this modification, the NAND gates 30, the NOR gates 28 and the inverters 29 can be longitudinally arranged, in the same manner as in the first embodiment described above. Therefore, the timing selecting circuit 27 including m sets of the NOR gates 28, the NAND gates 30 and the inverters 29 can be formed within the width of the conventional shift register 26 having m bits.

Figure 14:
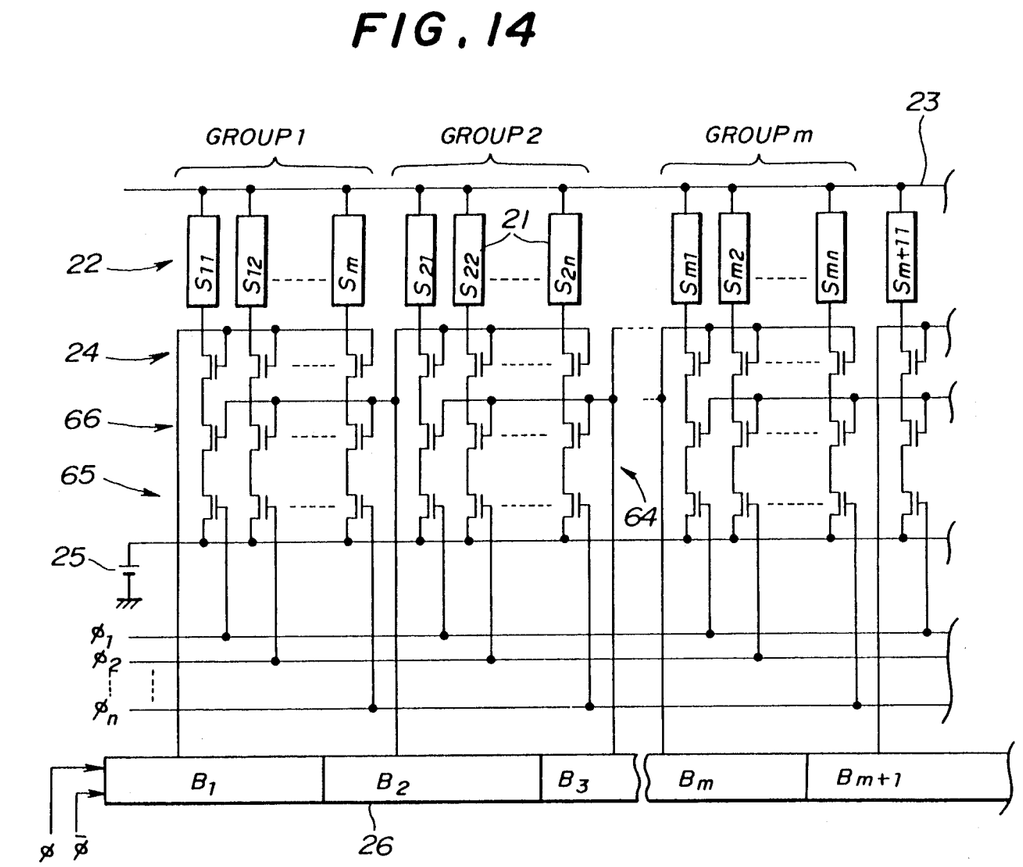
FIG. 14 is a circuit diagram showing a second embodiment of the full-size optical sensor device according to the present invention.
Figure 15:
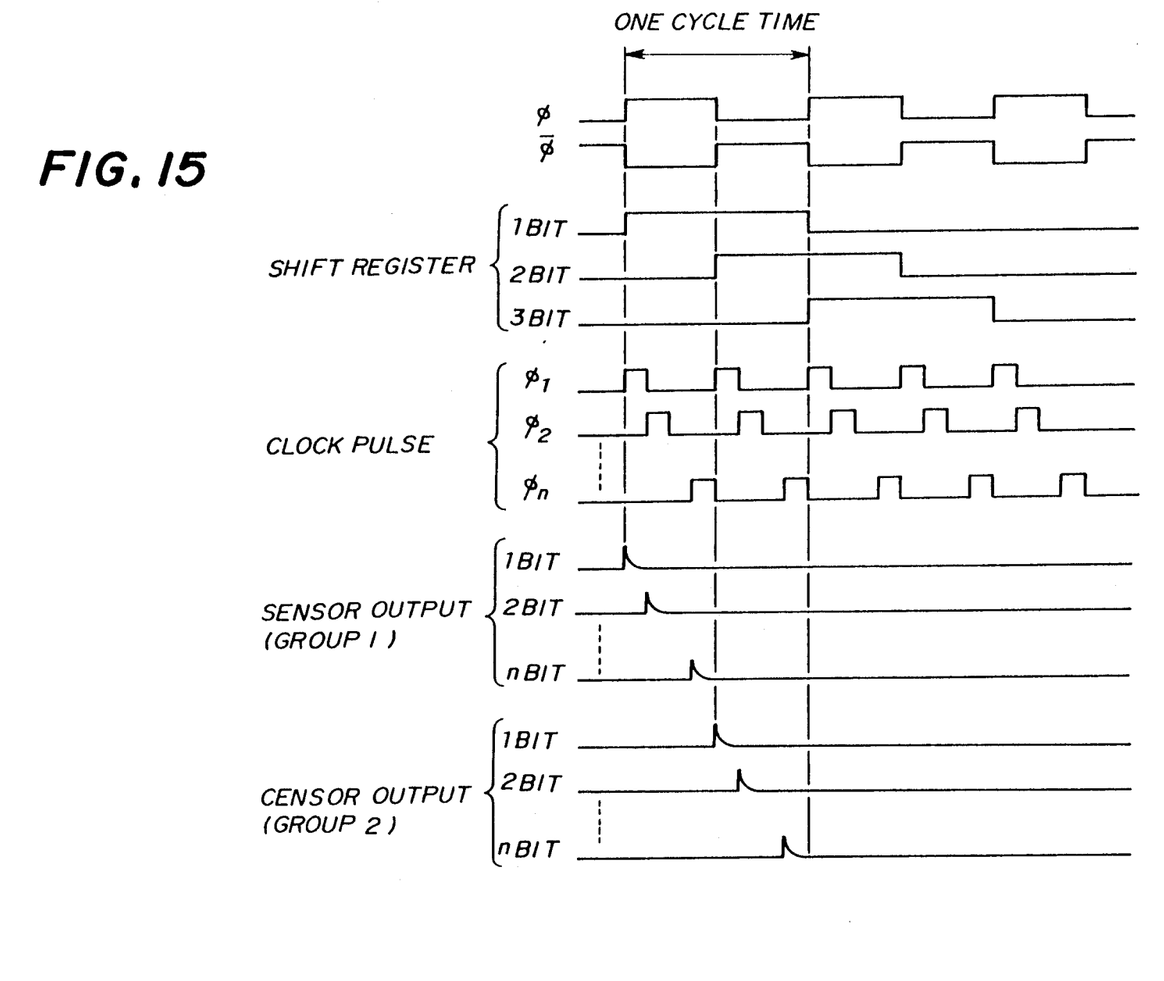
FIG. 15 is a wave form chart indicating an operation of the contact type full-size image sensor shown in FIG. 14.

A description will now be given of a second embodiment of the present invention with reference to FIGS. 14 and 15. In FIGS. 14 and 15, those parts which are the same as those shown in FIGS. 4 and 12 are given the same reference numbers and a description thereof is omitted.

Referring to FIG. 14, the sensor array 22, the analogue switch 24 in which each of the switch elements is a N channel type TFT and the timing selecting circuit 64 are connected in series between the signal output line 23 and the power source 25, and they are respectively divided into a plurality of groups. The timing selecting circuit 64 has a second analogue switch 66 and a third analogue switch 65. Each of the switch elements in the third analogue switch 65 is an N channel type TFT having a clocked gate, and each of the switch elements in the second analogue switch 66 is a P channel type TFT. Each of the groups has n photoelectric conversion elements 21 and n switch elements in respectively the analogue switch 24, the third analogue switch 65 and the second analogue switch 66. Each of the bits of the shift register 26 corresponds to one of the groups described above. Each of the clock pulses $\phi 1, \phi 2, \ldots , \phi n$ is supplied to one of the groups from the external controller. The shift register 26 is driven in synchronism with two clock pulses $\phi$ and $\bar{\phi}$. A cycle time of each of clock pulses $\phi 1, \phi 2, \ldots , \phi n$ is half of a cycle time of the clock pulse $\phi$. A duty cycle of each of the clock pulses $\phi 1, \phi 2, \ldots , \phi n$ is a value of $(1/n \cdot 100\%)$, and each of the clock behind a last clock pulse $\phi$ i-1, as shown in FIG. 15.

In the k-th group (k=1, 2, ..., m, ...), the k-th bit of the shift register 26 is connected to the gate of each of the switch elements in the analogue switch 24. Each switch element in the second analogue switch 66 is connected to the (k+1)-th bit of the shift register 26. A clock pulse $\phi$ i of clock pulses $\phi 1, \phi 2, \ldots , \phi n$ is supplied to the gate of the i-th switch element in the third analogue switch 65.

The contact type full-size image sensor having the structure described above operates in accordance with a wave form chart as shown in FIG. 15

The clock pulses $\phi$ and $\phi$ have a lag of a half cycle time between each other. Each of the odd numbered bits B1, B3, . . . ,B2j−1 of the shift register 26 undergoes a transition between high and low bit levels in synchronism with the clock pulse $\phi$ , and each of the even numbered bits B2, B4, . . . , B2j of the shift register 26 undergoes a transition between high and low bit levels in synchronism with the clock pulse $\phi$.

When the bit B2j−1 (j=1, 2, . . . ) of the shift register 26 becomes a high bit level, each of the switch elements ( N channel type TFT )in the analogue switch 24 in the group (2j−1) is turned ON. At this time, the next bit B2j of the shift register 26 becomes a low bit level so that each of the switch elements ( P channel type TFT ) in the second analogue switch 66 is turned ON. Then, when the clock pulse $\phi$ becomes a high bit level, switch elements in the third analogue switch 65 turn ON in a regular order in accordance with clock pulses $\phi$ 1, $\phi$ 2, . . . , $\phi$ n. Therefore, the photoelectric conversion elements in the group (2j−1) are driven in a regular order in accordance with clock pulses $\phi$ 1, $\phi$ 2, . . . , $\phi$n. That is, the photoelectric conversion elements in the group (2j−1) output image signals in a regular order in accordance with clock pulses $\phi$ 1, $\phi$ 2, . . . , $\phi$ n. Next, when the next bit B2j of the shift register 26 becomes a high bit level, each of the switch elements in the analogue switch 24 in the next group (2j) is turned ON and each of the switch elements in the second analogue switch 66 in the last group (2j−1) is turned OFF. At this time, the next bit B2j+1 of the shift register 26 becomes a low bit level so that each of the switch elements in the second analogue switch 66 in the group(2j) is turned ON. Therefore, all of the photoelectric conversion elements in the group (2j−1) are prevented from being driven, and the photoelectric conversion elements in the group (2j) are driven in a regular order in accordance with clock pulses $\phi$ 1, $\phi$ 2, . . . , $\phi$ n in the same manner as in the case of the last group (2j−1).

According to the second embodiment, it is possible to increase the density of the sensor array without increasing the TFTs making up the shift register 26, in the same manner as in the first embodiment.

Figure 16:
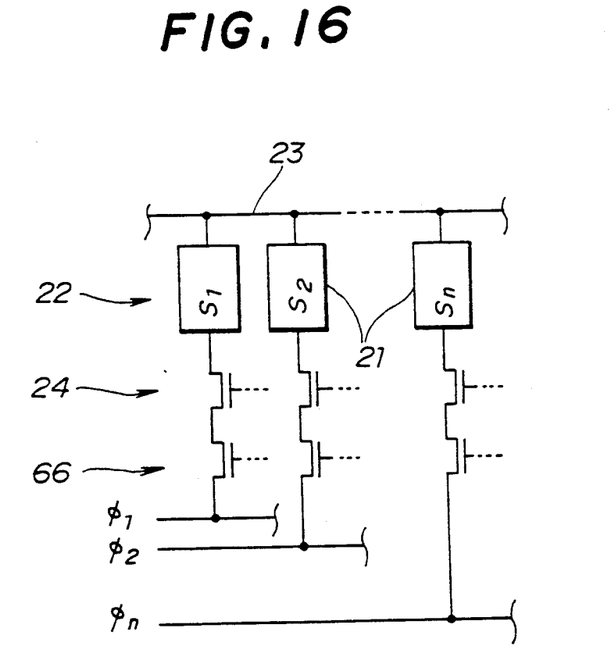
FIG. 16 is a circuit diagram illustrating the full-size optical sensor device according to a modification of the second embodiment.

In addition it is possible to omit the third analogue switch 65. In this case, as shown in FIG. 16, the contact type full-size image sensor is structured so that one of the clock pulses $\phi$ 1, $\phi$ 2, . . . , $\phi$ n is directly supplied to the source of the corresponding switch element (P channel type TFT ) of the second analogue switch 66.

According to the present invention, each of the bits of the shift register drives a plurality of photoelectric conversion elements so that a number of the thin film transistors making up the shift register is less than the conventional number of the same type of transistors in the prior art. Thus, it is possible to increase the density of the sensor array without increasing e the density of TFTs in the shift register. It is unnecessary to miniaturize TFTs of the shift register so that there is no deterioration of the characteristics of the sensor device due to the elasticity of the substrate during production. In addition, all of photoelectric conversion elements are connected to one signal output line so that the signal processing system is simple. Also one of the photoelectric conversion elements in a group is selected by an external control signal and it is unnecessary to provide a matrix line circuit so that a noise in the output signal is prevented from occurring. Thus, it is possible to prevent the signal from the shift register from being attenuated, and a dispersion among levels of output signals corresponding to bits of the image sensor is decreased.

The present invention is not limited to the aforementioned embodiments, and variations and modifications may be made without departing from the scope of the claimed invention.

What is claimed is:

1. A full-size optical sensor device comprising:
a sensor array including a plurality of photoelectric conversion elements which are arranged in a line, each of said photoelectric conversion elements outputting image signal to one signal output line, and wherein said sensor array is divided into a plurality of groups, each of them including a plurality of said photoelectric conversion elements; and
driving means, coupled to said sensor array, for selectively driving said photoelectric conversion elements of said sensor array,
said driving means comprising;
shift register means, having a plurality of bits which are arranged in a line, for shifting a predetermined binary data, and
selecting means for selecting one of said driven photoelectric conversion elements in accordance with an external control signal and said predetermined binary data shifted by said shift register means, said selecting means having a plurality of circuit sets, each of said circuit sets being connected between one of the bits of said shift register means and one of said groups having photoelectric conversion elements, wherein each of said circuit sets selects one of said driven photoelectric conversion elements in a corresponding one of said groups in accordance with said external control signal when a corresponding one of said bits of said shift register means has said predetermined binary data.

2. A full-size optical sensor device as claimed in claim 1, wherein each of said circuit sets has an analogue switch including a plurality of switch elements, each of said switch elements being connected to one of said photoelectric conversion elements in a corresponding one of said groups, and a logic circuit which makes one of said switch elements of said analogue switch turn on in accordance with said external control signal.

3. A full-size optical sensor device as claimed in claim 2, wherein the number of states which can be expressed by said external control signal is equal to or greater than the number of said photoelectric conversion elements in each of said groups, and said logic circuit has a plurality of gate circuits, each of said gate circuits making one of said switch elements turn on when said external control signal is in one of said states.

4. A full-size optical sensor device as claimed in claim 2, wherein each of said groups includes two photoelectric conversion elements and said external control signal undergoes a transition between high and low levels, and wherein said logic circuit has a first gate circuit making a switch element turn on when said external control signal is a high level signal and a second gate circuit making another switch element turn on when said external control signal is a low level signal.

5. A full-size optical sensor device as claimed in claim 2, wherein said first gate circuit has a NOR gate inputting said external control signal and a signal output from a corresponding one of said bits of said shift register, a first output signal from said NOR gate being supplied to said switch element so that said switch element is turned on or off based on a state of said first output signal from said NOR gate.

6. A full-size optical sensor device as claimed in claim 4, wherein said second gate circuit has an inverter which inputs said external control signal and a NAND gate which inputs a signal output from said inverter and a signal output from a corresponding one of said bits of said shift register, a second output signal from said NAND gate being supplied to said another switch element so that said another switch element is turned on or off based on a state of said second output signal from said NAND gate.

7. A full-size optical sensor device as claimed in claim 4, wherein said second gate circuit has an inverter which inputs a signal output from a corresponding one of the bits of said shift register and a NAND gate which inputs a signal output from said inverter and said external control signal, a third output signal from said NAND gate being supplied to said another switch element is turned on or off based on a state of said third output signal from said NAND gate.

8. A full-size optical sensor device as claimed in claim 2, wherein each of said switch elements of said analogue switch has a thin film transistor.

9. A full-size optical sensor device as claimed in claim 1, wherein each of said groups has n photoelectric conversion elements and said external control signal has n clock pulses, each of said clock pulses lagging by one pulse behind a last clock pulse, and wherein each of said circuit sets has a first analogue switch including n first switch elements, a second analogue switch including n second switch elements and a third analogue switch including n third switch elements, one of said first switch elements, one of said second switch elements and one of said third switch elements being connected in series between one of said photoelectric conversion elements and a power source, said first switch elements being controlled by a signal output from a corresponding one of the bits of said shift register means, said second switch element being controlled by a signal output from another one of the bits of said shift resister means and each of said third switch elements being controlled by one of said clock pulses.

10. A full-size optical sensor device as claimed in claim 9, wherein each of said first switch elements in said first analogue switch has a thin film transistor.

11. A full-size optical sensor device as claimed in claim 9, wherein each of said second switch elements in said second analogue switch has a thin film transistor.

12. A full-size optical sensor device as claimed in claim 9, wherein each of said third switch elements in said third analogue switch has a thin film transistor.

13. A full-size optical sensor device as claimed in claim 9, wherein each of said first switch elements has a N channel type thin film transistor, each of said second switch elements has a P channel type thin film transistor and each of said third switch elements has a N channel type thin film transistor.

14. A full-size optical sensor device as claimed in claim 1, wherein each of said groups has n photoelectric conversion elements and said external control signal has n clock pulses, each of said clock pulses lagging by one pulse behind a last clock pulse, and wherein each of said circuit sets has the first analogue switch including n first switch elements and the second analogue switch including n second switch elements, one of said first switch elements and one of said second switch elements being connected in series between one of said photoelectric conversion elements and a signal line to which one of said clock pulses is supplied, said first switch elements being controlled by a signal output from a corresponding one of the bits of said shift register means and said second switch elements being controlled by a signal output from another one of the bits of said shift resister means.

15. A full-size optical sensor device as claimed in claim 14, wherein each of said first switch elements in said first analogue switch has a thin film transistor.

16. A full-size optical sensor device as claimed in claim 14, wherein each of said second switch elements in said second analogue switch has a thin film transistor.

17. A full-size optical sensor device as claimed in claim 14, wherein said each of said first switch elements has a N channel type thin film transistor and each of said second switch elements has a P channel type thin film transistor.

* * * * *